UNITED STATES PATENT OFFICE.

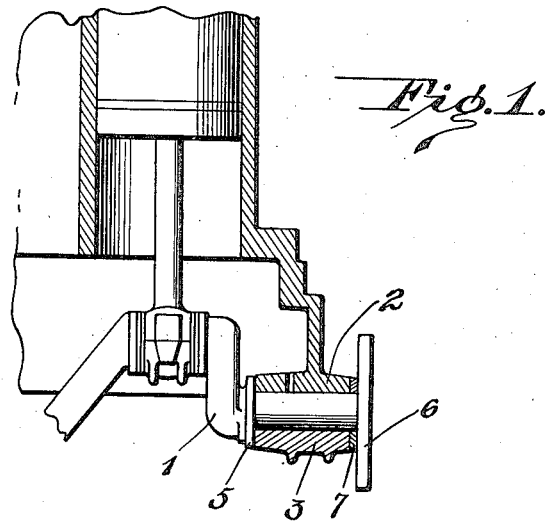
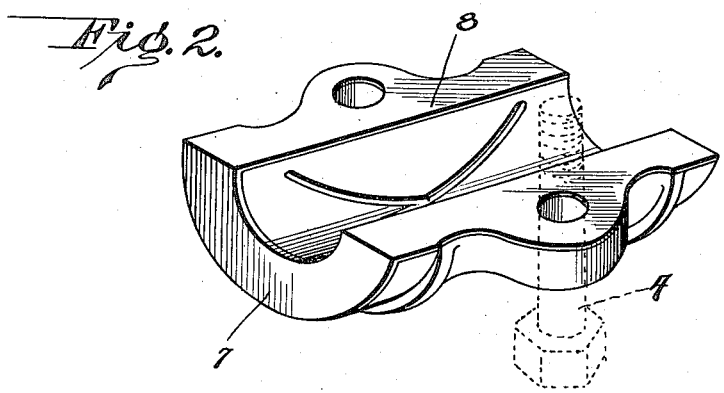
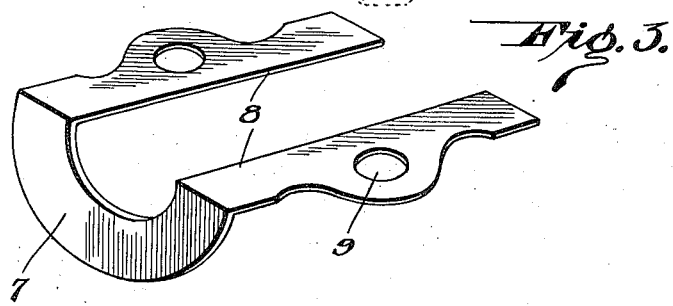

JOHN G. HAMLIN, OF TALLAHASSEE, FLORIDA.

COMBINED BEARING SHIM AND WEAR-COMPENSATING WASHER.

1,418,920.   Specification of Letters Patent.   Patented June 6, 1922.

Application filed November 21, 1921. Serial No. 516,667.

*To all whom it may concern:*

Be it known that I, JOHN G. HAMLIN, a citizen of the United States, residing at Tallahassee, in the county of Leon and State of Florida, have invented certain new and useful Improvements in Combined Bearing Shims and Wear-Compensating Washers, of which the following is a specification.

The invention comprehends a combined bearing shim and wear compensating washer, designed primarily for use in crank shaft bearings of automobiles and the like, whereby undesirable end play of the crank shaft, incident to end wear of the bearing, may be taken up, while at the same time maintaining a proper shim-spacing of the bearing halves.

In automobiles, particularly of the Ford type, end play of the crank shaft tends to develop through the actuation of the clutch pedal, and as the crank shaft carries the fly wheel to which the magnets of the magneto are bolted, it is obvious that undesirable end play of such crank shaft tends to a separation of the magnets and fixed magneto coils, resulting in faulted ignition.

The present invention aims to compensate for this end play of the crank shaft in providing a wear-compensating washer, of appropriate thickness to take up the wear, and to provide a means for securing this washer, or more properly half washer, to the removable half of the bearing, which will avoid the necessity of forming the washer with screw holes or other securing means formed directly therein or therewith. The wear resisting washer securing means of the present invention forms a material part of the construction, in that such means is provided in the form of bearing shims, as ordinarily employed between the mating halves of the bearing proper. Thereby the securing means for the wear resisting washer, in addition to securing said washer in place, serves the usual shim function, and thus permits the attachment to be readily applied and secured in operative position by the bolts for securing the bearing halves together.

In the drawings:

Fig. 1 is a view in elevation showing a portion of the crank shaft and the rear bearing therefor, the combined shim and wear compensating washer being shown in place.

Fig. 2 is a perspective view of the lower half of the bearing, showing the combined shim and wear compensating washer in position thereon.

Fig. 3 is a perspective view of the combined shim and wear compensating washer.

In the drawings, there is illustrated a conventional type of bearing and crank shaft, as designed more particularly for the Ford automobile, wherein the crank shaft 1 is supported in a bearing including an upper half, usually integral with the block, as at 2, and a lower half 3, adapted for removable connection to the upper half by bolts 4. In the type illustrated the crank shaft has front and rear flanges 5 and 6 to cooperate with the ends of the bearing, the latter, in the Ford type of automobile, being of increased size to permit the engine fly wheel to be secured thereto.

In continued use, the end thrust of the crank shaft causes a wear of the bearings, which, if not compensated for, permits such end play of the shaft as to eventually disturb the proper cooperation of the magneto parts, with a resultant faulty ignition.

It has been heretofore proposed to apply wear compensating washers to the ends of the bearings, to take up the end play of the shaft, but such constructions require means formed in or on the washer part for securing it in position, and this is objectionable in that it provides additional parts which become loose in use, and further requires considerable time and machine work in applying the washer.

The present invention overcomes these objections to the usual wear compensating washer, in providing a washer which may be readily and quickly applied, and which may be secured in place without special attention, in and by the means for securing the bearing halves together, that is, the bolts 4. In thus providing for securing the wear compensating washer in place, the means utilized for holding the washer are particularly designed for and serve an important and additional function, that is, as shims for the proper relative adjustment of the bearing halves.

The improved structure therefore, comprises an integral element, formed at one end to provide a half washer 7, from the ends of which, and at right angles to the plane of the washer, extend spaced parallel plate sections, 8, designated as and adapted to perform the function of shims. These shim sections are of course adapted to the ordinary shim function, that of maintaining the proper relative spacing of the bearing halves, and, as usual with shims, are formed at appropriate points in their lengths with openings 9 through which the bearing bolts 4 are adapted to pass in securing the bearing halves together.

In application, the attachment is placed upon the lower half of the bearing, the shim portions overlying the side edges of the bearing half in the usual manner, with the holes in the shim portions registering with the holes in the bearing half. In this position the wear compensating washer 7 rests squarely against the end of the bearing half, to thus provide the additional thickness required between said bearing and adjacent crank shaft flange, to take up the end play of the shaft. In this position, the application of the lower bearing half through the bolts 4, secures the wear compensating washer in proper position, through and by securing the shim portions of the device in place. Thus the attachment may be readily and quickly applied or removed, merely in the usual application of the bearing half, and any change or addition to the bearing, or machine work of any character is entirely avoided.

It is of course to be understood that the attachment is to be constructed in varying thicknesses of wear compensating washer portions, and in varying thicknesses of shim portions, in order to take care of any and all possible conditions of wear. Furthermore, the combined shim and wear compensating washer may be used with any and all main bearings, and in any type of automobile or particular construction of such bearing.

Having thus described my invention, what is claimed as new, is:—

1. A wear compensating attachment for bearings, comprising a half washer portion, and shim forming plates projecting at right angles from spaced portions of said half washer.

2. The combination with a bearing having a removable half, and bolts to secure the halves together, of a wear compensating washer, and means cooperating with said bolts for securing the washer in place at the end of the bearing.

3. The combination with a bearing having a removable half, and bolts to secure the halves together, of a wear compensating washer, and means cooperating with said bolts for securing the washer in place at the end of the bearing, said means serving as bearing shims.

4. A wear compensating attachment for bearings including an integral element having a semi-annular end portion and spaced plates projecting from the ends of the said semi-annular portion and at right angles to the plane of such portion.

In testimony whereof I affix my signature.

JOHN G. HAMLIN.